(12) United States Patent
Lindstrom

(10) Patent No.: US 6,788,995 B1
(45) Date of Patent: Sep. 7, 2004

(54) SYSTEM AND METHOD OF FLEXIBLY SORTING AND UNLOADING FINISHED PARTS DURING PART MANUFACTURING PROCESS

(75) Inventor: Mikko Lindstrom, Streamwood, IL (US)

(73) Assignee: Finn-Power International, Inc., Arlington Heights, IL (US)

( * ) Notice: Subject to any disclaimer, the term of this patent is extended or adjusted under 35 U.S.C. 154(b) by 438 days.

(21) Appl. No.: 09/708,534

(22) Filed: Nov. 9, 2000

Related U.S. Application Data

(62) Division of application No. 08/260,784, filed on Jun. 16, 1994, now Pat. No. 6,377,864.

(51) Int. Cl.[7] .............................. G06F 19/00; B07C 5/00
(52) U.S. Cl. .......................... 700/183; 700/96; 700/213; 209/598; 209/603
(58) Field of Search ................... 700/183, 96; 209/598, 209/603

(56) References Cited

U.S. PATENT DOCUMENTS

| | | | |
|---|---|---|---|
| 4,195,346 A | 3/1980 | Schroder | .................... 700/167 |
| 4,554,635 A * | 11/1985 | Levine | ........................ 700/183 |
| 4,819,176 A | 4/1989 | Ahmed et al. | ............... 700/109 |
| 5,161,109 A | 11/1992 | Keating et al. | ............. 705/410 |
| 5,222,855 A | 6/1993 | Bernard, II et al. | .... 414/331.03 |
| 5,317,516 A * | 5/1994 | Taijonlahti et al. | ........... 700/96 |

* cited by examiner

*Primary Examiner*—Leo Picard
*Assistant Examiner*—Sheeza Rao
(74) *Attorney, Agent, or Firm*—Louis Woo

(57) ABSTRACT

The present invention relates to a system and method therefor of sorting and unloading various pieces cut from sheet blanks which have different dimensions in a sheet metal fabricating environment. To achieve this end, prior to the production run, the various program routines whose operations for effecting the cutting of the sheet blanks are retrieved and the data relevant to the to be cut pieces are grouped and analyzed so that pieces of different dimensions cut in accordance with the different program routines are respectively allocated to the corresponding sorting addresses for unloading. Accordingly, different pieces with the same dimension cut from different program routines during the same production run are unloaded to the same location of the unloader area. Optimization of the unloading process and optimal utilization of the available loading space are thereby achieved.

2 Claims, 17 Drawing Sheets

```
JETCAM - CNC PROGRAMMING SYSTEM
==================================================
  BATCH PREFIX: SAM      DATE: 94-03-10 12:18      UNITS: INCHES
**** BATCH PROCESSING SHEET FOR: Finn-Power TP 4025 RAS 880N DEMO ****
==================================================
                            | MATERIAL   : 16ACRS
                            | THICKNESS  : 0.06
                            ==========================
     Blank Sheet Size in X --> 96  |120 | 96 |
                         Y --> 48  | 60 | 48 |
                            ==========================
     DNC Number in the Batch -->001|002|003|
       Blank Sheets to process-->  1 |  1 |  1 |
       DNC Program Length (kB)-->  0 |  0 |  0 |
          Material Usage (%) --> 91 | 90 | 90 |
```

| No. | COMPONENT NAME | MAKE | Number on Sheet(s) |     |     |
|-----|----------------|------|-----|-----|-----|
| 1   | PART 1         | 20   |     | 7   |     |
| 2   | PART 2         | 20   |     | 5   |     |
| 3   | PART 3         | 20   | 8   | 10  | 2   |
| 4   | PART 4         | 20   |     | 9   | 10  |
| 5   | PART 5         | 20   | 3   | 4   | 13  |
| 6   | PART 6         | 20   | 15  |     | 5   |
| 7   | PART 7         | 20   |     |     | 1   |

FIG. 3

```
JETCAM - CNC PROGRAMMING SYSTEM
DATE: Thu Mar 10 12:33:46 1994              UNITS : INCHES
************************************************************
*******   SET-UP-SCHEDULE FOR: Finn-Power TP 4025 RAS 880N DEMO  *******
************************************************************
                                            PRG. NO. : 13

FILE NAME : SAM-001                JOB ID : none
MATERIAL CODE : 16ACRS             THICKNESS : 0.06
SHETT SIZE : X= 96.0    Y= 48.0    NO. OF SHEETS : 1
COMPONENTS(S) :
PART3             : Size 44.0 x 11.0, Number = 8
PART5             : Size 15.0 x 3.875, Number = 3
PART6             : Size 3.0 x 3.0, Number = 15

SHEET USAGE EFFICIENCY (RECTANGULAR) : 91%

************************************************************
*******        RUN TIME ESTIMATION - OPTIMIZED        *******
************************************************************
        SINGLE HITS              = 827
        NIBBLE HITS              = 0
        TOTAL DISTANCE TRAVELLED = 1688.7993
        TOOL CHANGES             = 5
        CNC PROGRAM SIZE         = 11850
        TOTAL TIME per SHEET     = 6min, 31sec
==========================================================
CLAMPS :    1= 25.0       2= 47.2441      3= 69.685
************************************************************
*******              TOOL ASSIGNMENT LIST             *******
************************************************************
TOOL DESCRIPTION           ANGLE    DIE CLEAR.    STATION
----------------------------------------------------------
  SQUARE      : 0.25        0.00      0.012        33 M8
  CIRCULAR    : 0.25 dia.             0.012        29 M8
  SQUARE      : 1.0         0.00      0.012        20
  RECTANGULAR : 1.0 x 0.25  INDEX     0.012        17
  CIRCULAR    : 1.0 dia.              0.012        12
  SQUARE      : 2.0         INDEX     0.012        9
----------------------------------------------------------
REMARKS :
```

FIG. 4

```
JETCAM  -  CNC PROGRAMMING SYSTEM

DATE:  Thu Mar 10  12:43:42  1994                    UNITS  :   INCHES
*********************************************************************
*******  SET-UP-SCHEDULE FOR: Finn-Power TP 4025 RAS 880N DEMO *******
*********************************************************************
                                                    PRG. NO. : 13

FILE NAME : SAM-002                      JOB ID :  none
MATERIAL CODE :   16GACRS                THICKNESS : 0.06
SHEET SIZE : X=  12.0         Y=  60.0   NO. OF SHEETS :  1
COMPONENTS(S) :
PART3                       : Size 44.0 x 11.0,  Number = 10
PART4                       : Size 16.0 x 10.0,  Number =  9
PART5                       : Size 15.0 x 3.875, Number =  4

SHEET USAGE EFFICIENCY (RECTANGULAR) :  90%

*********************************************************************
********             RUN TIME ESTIMATION - OPTIMIZED          ********
*********************************************************************
            SINGLE HITS              = 1400
            NIBBLE HITS              = 0
            TOTAL DISTANCE TRAVELLED = 3547.7402
            TOOL CHANGES             = 11
            CNC PROGRAM SIZE         = 18636
            TOTAL TIME per SHEET     = 9min, 15sec
=====================================================================
CLAMPS :    1= 25.0       2= 47.2441       3= 69.685
*********************************************************************
********                TOOL ASSIGNMENT LIST                  ********
*********************************************************************
```

| TOOL DESCRIPTION | | ANGLE | DIE CLEAR. | STATION |
|---|---|---|---|---|
| CIRCULAR | : 0.25 dia. |  | 0.012 | 29 M8 |
| CIRCULAR | : 0.375 dia. |  | 0.012 | 30 M8 |
| SQUARE | : 0.5 | 0.00 | 0.012 | 34 M8 |
| SQUARE | : 1.0 | 0.00 | 0.012 | 20 |
| CIRCULAR | : 1.0 dia. |  | 0.012 | 12 |
| RECTANGULAR | : 1.0 x 0.25 | INDEX | 0.012 | 17 |
| SQUARE | : 1.25 | 0.00 | 0.012 | 10 |
| SQUARE | : 2.0 | INDEX | 0.012 | 9 |

REMARKS :

FIG. 6

```
JETCAM - CNC PROGRAMMING SYSTEM
DATE:  Thu Mar 10 12:44:58 1994                UNITS  :  INCHES
***********************************************************************
*******  SET-UP-SCHEDULE FOR: Finn-Power TP 4025 RAS 880N DEMO  *******
***********************************************************************
                                                PRG. NO. : 13
FILE NAME     : SAM-003                 JOB ID : none
MATERIAL CODE : 16GACRS                 THICKNESS : 0.06
SHETT SIZE  : X= 96.0       Y=  48.0    NO. OF SHEETS :  1
COMPONENTS(S) :
PART3                       : Size 44.0 x 11.0, Number =  2
PART4                       : Size 16.0 x 10.0, Number = 10
PART5                       : Size 15.0 x 3.875, Number = 13
PART1                       : Size 12.0 x 6.0, Number =  7
PART2                       : Size  8.0 x 6.0, Number =  5
PART7                       : Size  8.0 x 5.0, Number =  1
PART6                       : Size  3.0 x 3.0, Number =  5
SHEET USAGE EFFICIENCY (RECTANGULAR) :
***********************************************************************
*******             RUN TIME ESTIMATION  -  OPTIMIZED          *******
***********************************************************************
       SINGLE HITS                 = 1565
       NIBBLE HITS                 = 0
       TOTAL DISTANCE TRAVELLED    = 3744.1646
       TOOL CHANGES                = 7
       CNC PROGRAM SIZE            = 23041
       TOTAL TIME per SHEET        = 10min, 58sec
=========================================================
CLAMPS :   1= 25.0          2= 47.2441       3= 69.685
***********************************************************************
*******                 TOOL ASSIGNMENT LIST                   *******
***********************************************************************
TOOL DESCRIPTION              ANGLE    DIE CLEAR.   STATION
CIRCULAR    : 0.125 dia.                  0.012     28 M8
CIRCULAR    : 0.25 dia.                   0.012     29 M8
SQUARE      : 0.25             0.00       0.012     33 M8
CIRCULAR    : 0.375 dia.                  0.012     30 M8
SQUARE      : 0.5              0.00       0.012     34 M8
RECTANGULAR : 1.0 x 0.25       INDEX      0.012     17
CIRCULAR    : 1.0 dia.                    0.012     12
SQUARE      : 1.0              0.00       0.012     20
SQUARE      : 1.25             0.00       0.012     10
SQUARE      : 2.0              INDEX      0.012      9
RECTANGULAR : 3.0 x 0.25       INDEX      0.012      1
REMARKS :
```

FIG. 8

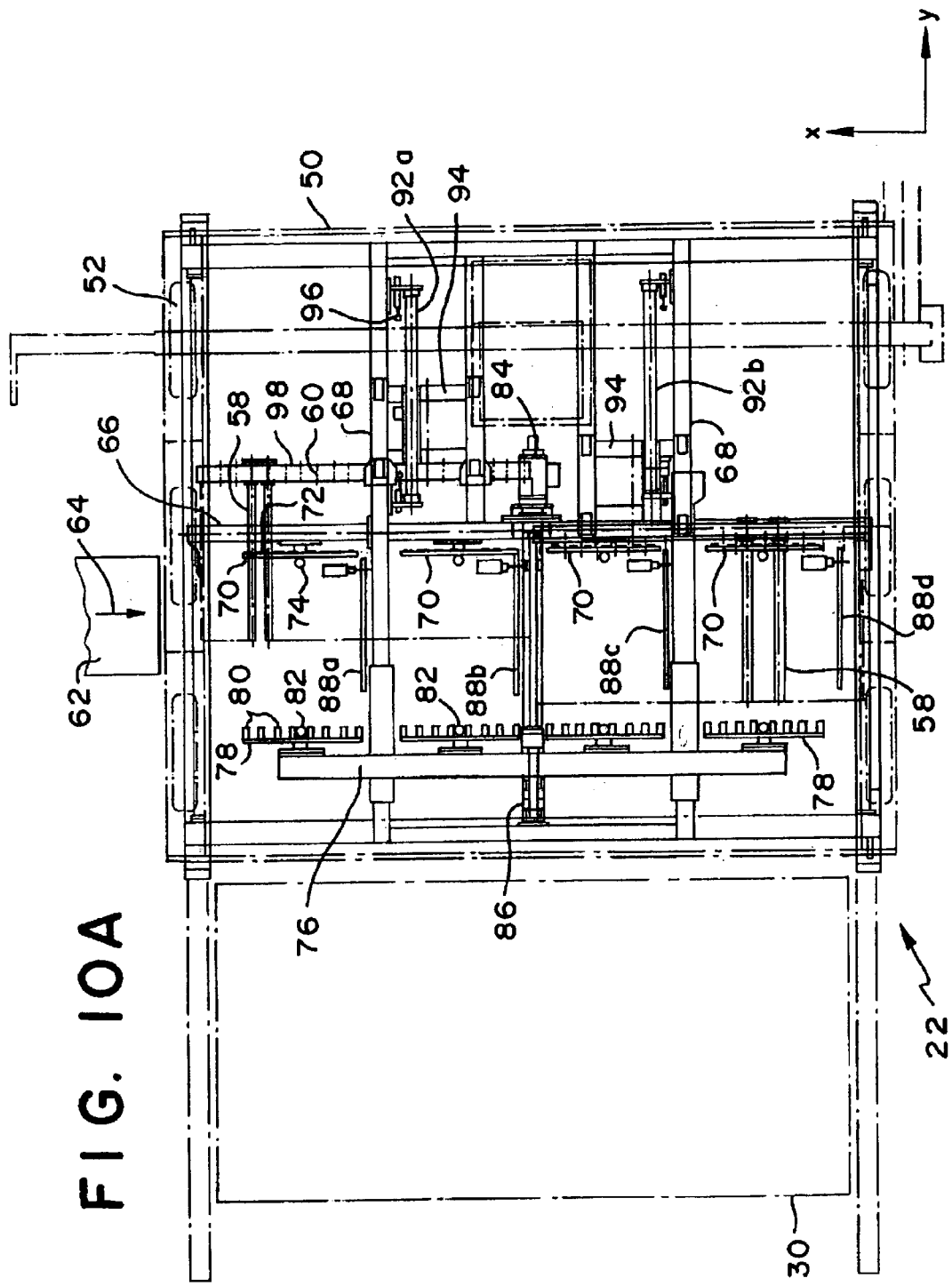

SYSTEM AND METHOD OF FLEXIBLY SORTING AND UNLOADING FINISHED PARTS DURING PART MANUFACTURING PROCESS

This is a divisional of application Ser. No. 80/260,784, filed Jun. 10, 1994, since issued as U.S. Pat. No. 6,377,864.

FIELD OF THE INVENTION

The present invention relates to manufacturing processes in a sheet fabrication environment and more particularly to a system and process therefor to sort and unload finished pieces in a flexible manufacturing system.

BACKGROUND OF THE INVENTION

In a numerically controlled sheet fabrication center, to produce parts from sheet blanks, part programs or routine files are used. Ordinarily, these part programs are stored in data banks so that an operator can retrieve one or more for each production or batch run. If the part desired has never been produced before, a new part program, or routine file, has to be written by a programmer for effecting that particular part from a sheet blank.

Each part program is considered a file and includes geometrical and technological definitions of the to be cut part. Some of the technological definitions include tooling data (size and shape of the tool, angle and position of tool changer, etc.), the order of tooling operation (which tool operates first, second, etc.), and the working sequence of a tool (what operations the tool performs and in what sequence—also known as optimized tool path). Among technological definitions, an important one is the sorting address, which is the location where a finished part is placed by the system.

Production requirements in sheet fabrication centers are such that certain parts need to be produced within a given delivery time. To achieve this end, programmers are given a list of parts that are required so that they can write a "nest program" for producing those parts. Some of the parameters which are utilized in a nest program include the sheet blank sizes that are available and the required material thickness. The nest program will select from among the available sheet blanks the one with the size that is most suitable for operation. In particular, in a nest program, the required different parts are laid out in accordance with the dimension of the selected sheet blank in an optimal fashion to maximize material utilization. In other words, scraps from the sheet blank are to be minimized.

The nest programs are run in the system sequentially. As parts defined by each of the nest programs are produced, they are sorted and directed to sorting addresses pre-defined for them in the nest program. Nest programs can be generated automatically from given production requirement lists and existing program files or routines. One existing software for defining such nest program is the JETCAM from the Finn-Power company.

The sorting addresses refer to the different locations in the unloading area of the part sorting and unloading system to which finished parts are to be placed. When a sorting address becomes full or when the product run is completed, the parts have to be removed from the sorting and unloading system in order to make room for the next production run. The operation for the removal in most cases involves manual labor. However, in advanced flexible manufacturing systems, such removal of parts may be done automatically.

The sorting and unloading of finished parts to different sorting addresses ordinarily proceeds uneventfully. However, in practice, given the limited quantity of available sorting addresses and the very large or unlimited quantity of different parts, problems do occur. For example, a produced part may have a sufficiently large dimension to cover more than one conventional sorting address to thereby limit the number of available sorting addresses in the system. Alternatively, if the production run requires that a large quantity of differently dimensioned parts be produced, then there may not be sufficient sorting addresses.

Yet another problem that occurs is when parts from different nest programs in the same production run have been designated by the respective nest programs to have the same sorting address or overlapping addresses. In this instance, insofar as the controller has no way of arbitrating which part from which nest program should take precedence over a particular sorting address, oftentimes the production run is stopped to allow the programmer/operator to effect modifications to the nest programs to rearrange the sorting addresses so that all parts may be sorted properly. Needless to say, this stopping of the system during a production run leads to inefficiency, lost production time, increased production cost and delivery times, and additional reset work to rearrange the sorting addresses.

BRIEF DESCRIPTION OF THE PRESENT INVENTION

To overcome the above problems, the present invention system incorporates a "denester" approach in which, prior to a production run, all of the nest programs to be run during the production are reviewed and all data relevant to the to be cut pieces are retrieved. The relevant data may include, for example, the sizes and dimensions of all of the parts to be cut during the production run with each of the nest programs. The dimensions from the different parts are then resorted and assigned to respective sorting addresses. Parts that have the same dimensions are assigned the same sorting address so that those same parts are directed to a particular location at the unloading area of the sorting and unloading system.

Since all the parts to be cut during the production run are analyzed—at least with respect to the respective dimensions and the number of those parts to be cut—prior to the production run, as parts are cut during the production run, those parts are directed to the sorting and unloading system in a predetermined fashion such that each part is directed to a corresponding sorting address. Since like parts are directed to the same sorting address, no conflict would arise even when sheet blanks are cut into different dimensioned pieces in accordance with different nest programs. Thus, with all part sizes, quantity and quality information predetermined, layouts for the sorted parts, in terms of the unloading area to which the sorted pieces are to be placed, is optimized so that all of the available part sorting addresses in the system are utilized to maximum capacity. No sorting address is therefore "overloaded" or "under utilized". Moreover, the production run will not be stopped on account of any potential "address flow alarm" or "sorting address conflict" in the middle of the production process. The setup time therefore decreases while production run efficiency increases. Furthermore, no intervention by the programmer/operator is required.

In the event that new nest programs are added during the production run, insofar as sorting addresses for the different dimensioned cut pieces have already been determined, the different pieces to be cut from each of the newly added nest programs can readily be routed to the appropriately predetermined sorting address. And a new sorting address is automatically calculated by the processor of the system for any of the to be cut pieces from any of the newly added nest programs which does not have a corresponding predetermined sorting address.

The calculation of any such new sorting address takes into consideration the unused space, if any, that is available at the being operated on unloading area. If no unused space is available at the being operated on unloading area, a new sorting address is created at a new unloading area. The being operated on unloading area is replaced by the new unloading area when the system begins to cut pieces from a work blank in accordance with the newly added nested program.

With the present invention system and method, a number of sorting and unloading systems can be utilized. Thus, different sorting addresses may be assigned to different systems. Some such exemplar sorting and unloading systems include a conveyor mechanism, a sorting device, a robot unloader mechanism, and a stacker mechanism.

An objective of the present invention is therefore to provide a system and method for ensuring a smooth production run in a sheet fabrication system.

It is yet another objective of the present invention to provide a system and method for ensuring optimal utilization of sorting addresses and therefore efficient unloading of cut pieces of different sizes and/or dimensions.

It is still another objective of the present invention to provide a system and method in which cut pieces of the same dimension are stacked in an unloading area of a pallet, storage bin, or cassette such that the available space of an unloading area is efficiently utilized.

BRIEF DESCRIPTION OF THE FIGURES

The above mentioned objectives and advantages of the present invention will become more apparent and the invention itself will be best understood by reference to the following description of an embodiment of the invention taken in conjunction with the following drawings, wherein:

FIG. 3 is an exemplar batch processing sheet illustrating an exemplar production run of the system utilizing three different nest programs;

FIG. 4 is an illustration of the parameters for the first nest program;

FIG. 6 is the setup illustration of the parameters of to be cut sheets from a second nest program;

FIG. 8 is an illustration of the last exemplar nest program for the exemplar production run of FIG. 3;

FIG. 10A is a plan view of a stacker sorting mechanism to be used with the instant invention system;

FIG. 13, comprising

DETAILED DESCRIPTION OF THE PRESENT INVENTION

Figure 1:
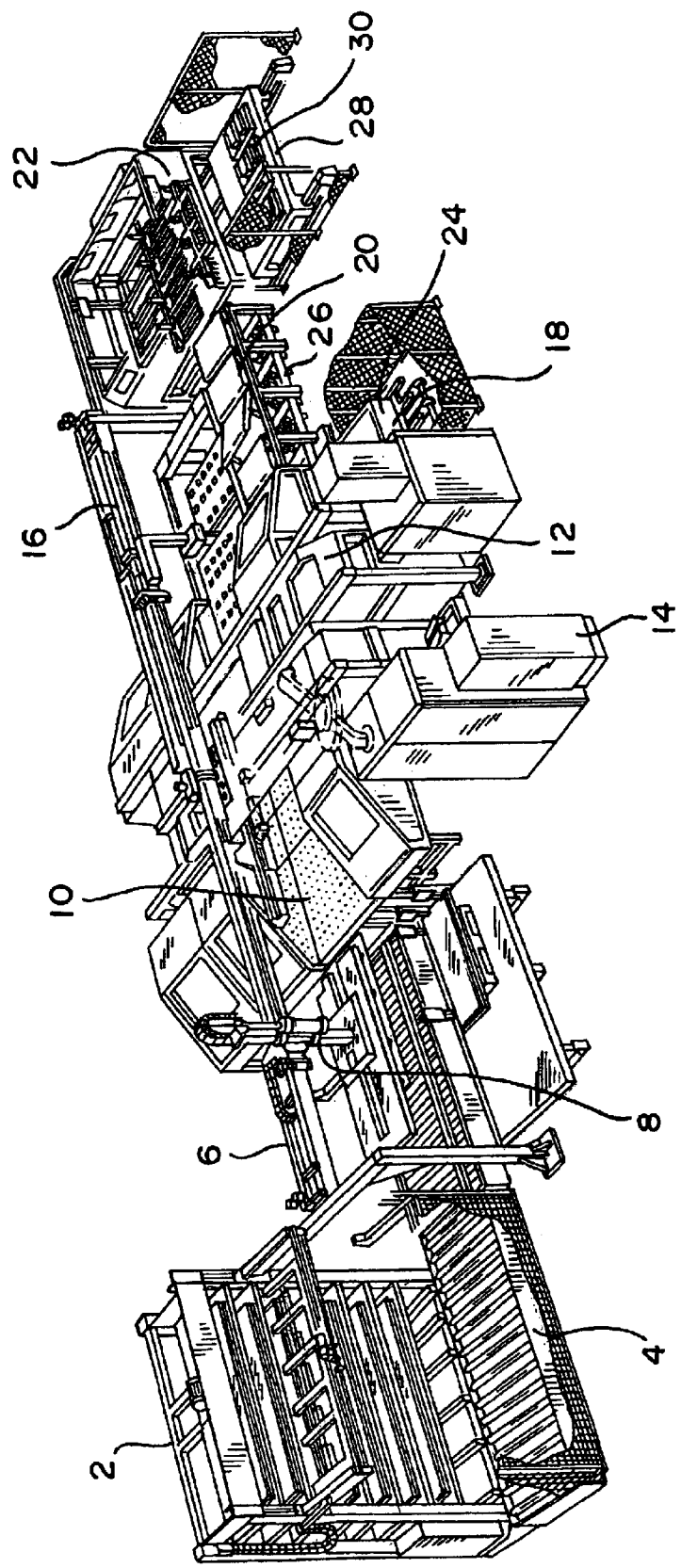
FIG. 1 is a perspective view of a flexible manufacturing system utilizing the instant invention.

With reference to FIG. 1, the flexible manufacturing sheet fabricating environment of the present invention system and method is shown. In particular, such flexible manufacturing system includes, among other components, an automatic storage system 2 in which sheet blanks or worksheets of various sizes are stored. These worksheets can each be loaded from the different bins of the storage system onto its conveyor 4 to be transported to the conveyor of a loading system 6. There, the worksheet is picked up by a loading mechanism 8 and transported to a machine center 10, which may comprise a turret punch press where different tools are used to effect different desired holes onto the worksheet. Adjacent to the turret punch press but also residing at the machine center 10 is a right angle shear system 12 for cutting pieces from the worksheet. The respective operations of the storage system 2, loading system 6, turret punch press and right angle shears are controlled by a numerical controller 14. Further controlled by controller 14 are an unloading device mainly comprising an unloading arm 16, an unloading/sorting device 18, an unloading/sorting conveyor system 20 and a stacker/unloading system 22.

Figure 5:
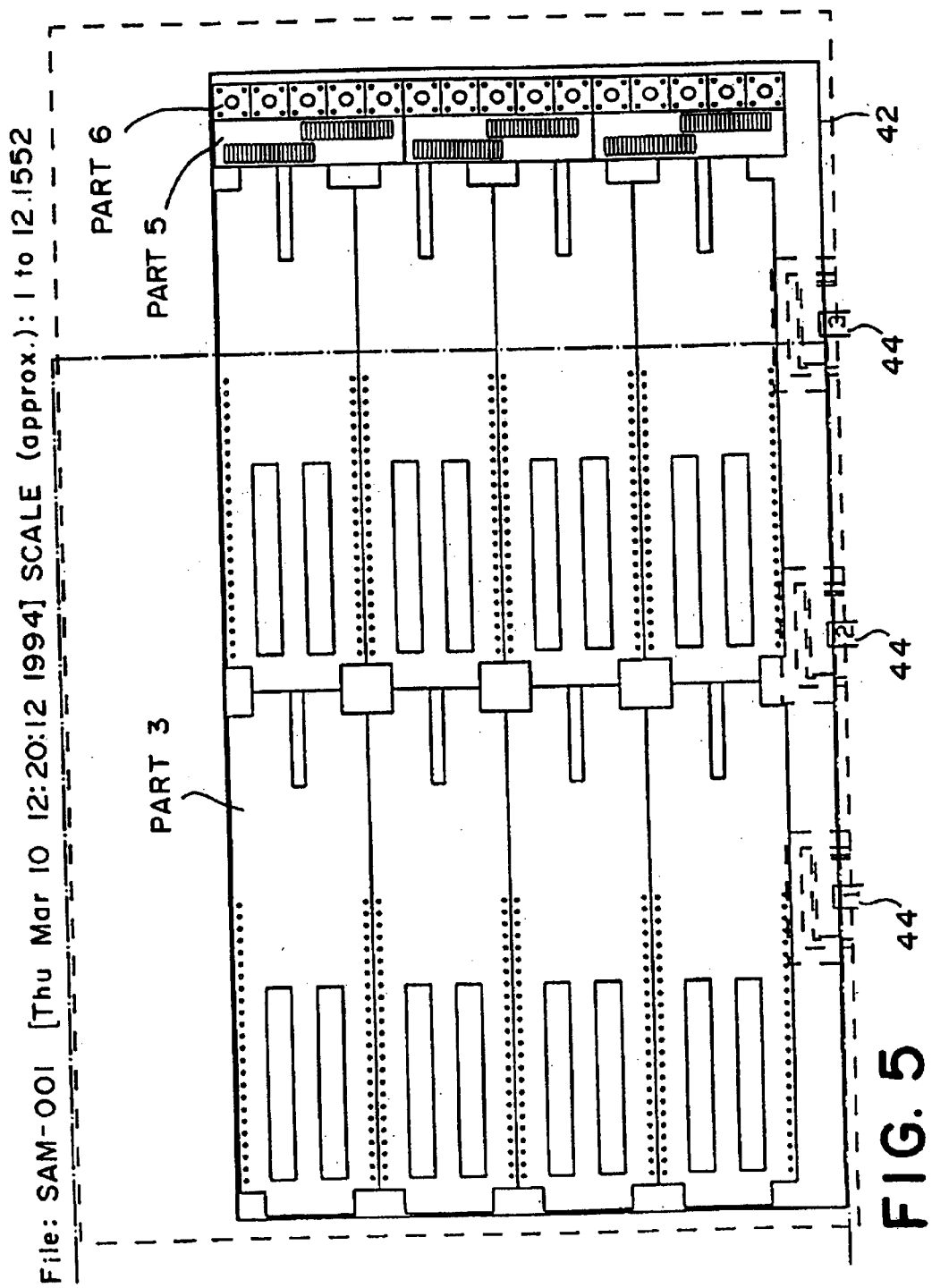
FIG. 5 is an illustration of the layout of pieces to be cut from a sheet blank in accordance with the nest program of FIG. 4.
Figure 7:
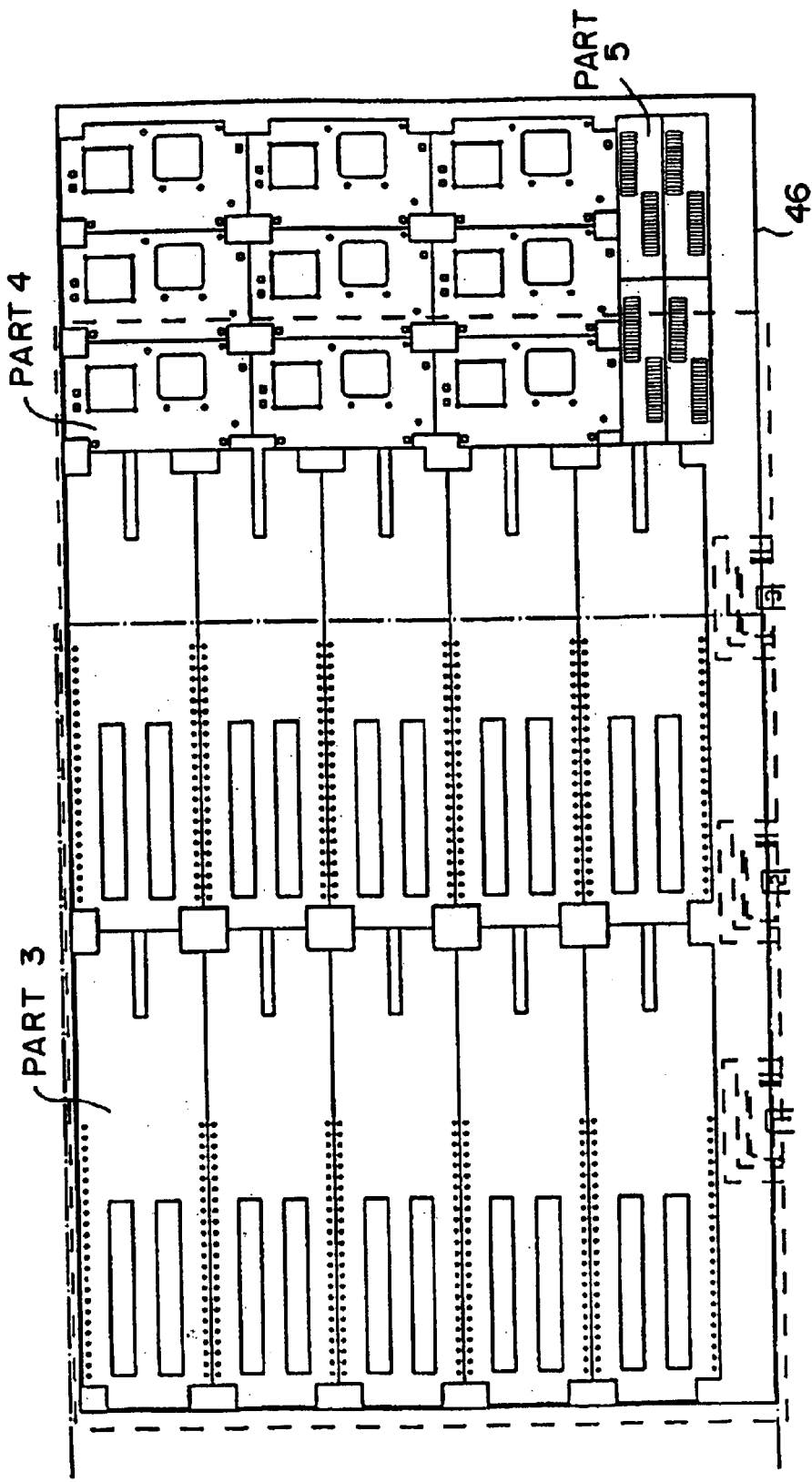
FIG. 7 illustrates a layout of the sheets to be cut from a sheet blank from the nest program of FIG. 6.
Figure 9:
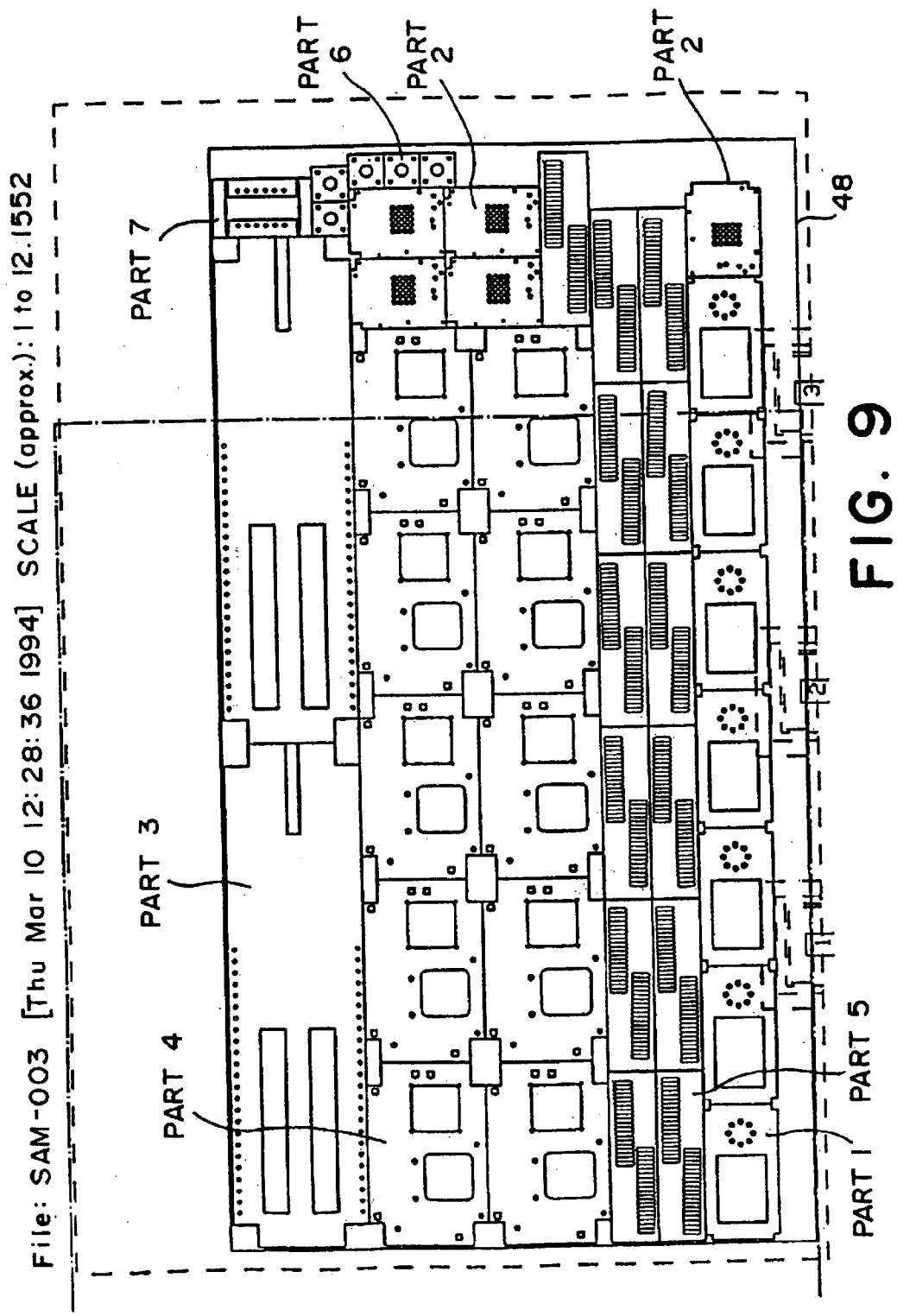
FIG. 9 is an illustration of the layout of the pieces to be cut in accordance with the nest program of FIG. 8.

The fabrication of worksheets from storage system 2 by either the turret punch press or the cutting shears, or other part fabricating devices such as laser or plasma cutters or bending machines, at machining center 10 is performed in accordance with program routines or files stored in controller 14. Some of these programs are so-called "nest" programs in which the pieces to be cut from a sheet blank are predefined according to their respective dimensions so that an optimal number of pieces may be cut from the sheet blank. Examples of layouts of pieces to be cut from worksheets are shown in FIGS. 5, 7 and 9, each to be discussed in detail further.

After being cut from a worksheet, the finished pieces are either unloaded by the unloading arm 16, or conveyed to sorting unit 18, conveyor system 20, or stacker/unloading system 22, in accordance with the particular operations of the different program routines. Putting it differently, a finished piece may either be conveyed to sorting unit 18, the multi-sectioned conveyor 20 and/or stacker/unloading system 22. As shown, sorting device 18 has a storage bin 24. For the multi-sectioned conveyor 20 (one section of which is shown to be pivoted upwards), a number of storage bins 26 are shown to be placed under the respective sections of the conveyor. As for stacker/unloading system 22, there is shown a cassette 28 onto which a plurality of pallets 30 are placed. A plurality of stacks of finished pieces in turn are placed on each of the pallets. As shown, cassette 28 is fitted with rollers resting on tracks which allow it to be positioned underneath the stacking mechanism of stacker/unloader system 22. A more detailed discussion of the stacker/unloading system 22 will be given later.

Figure 2:
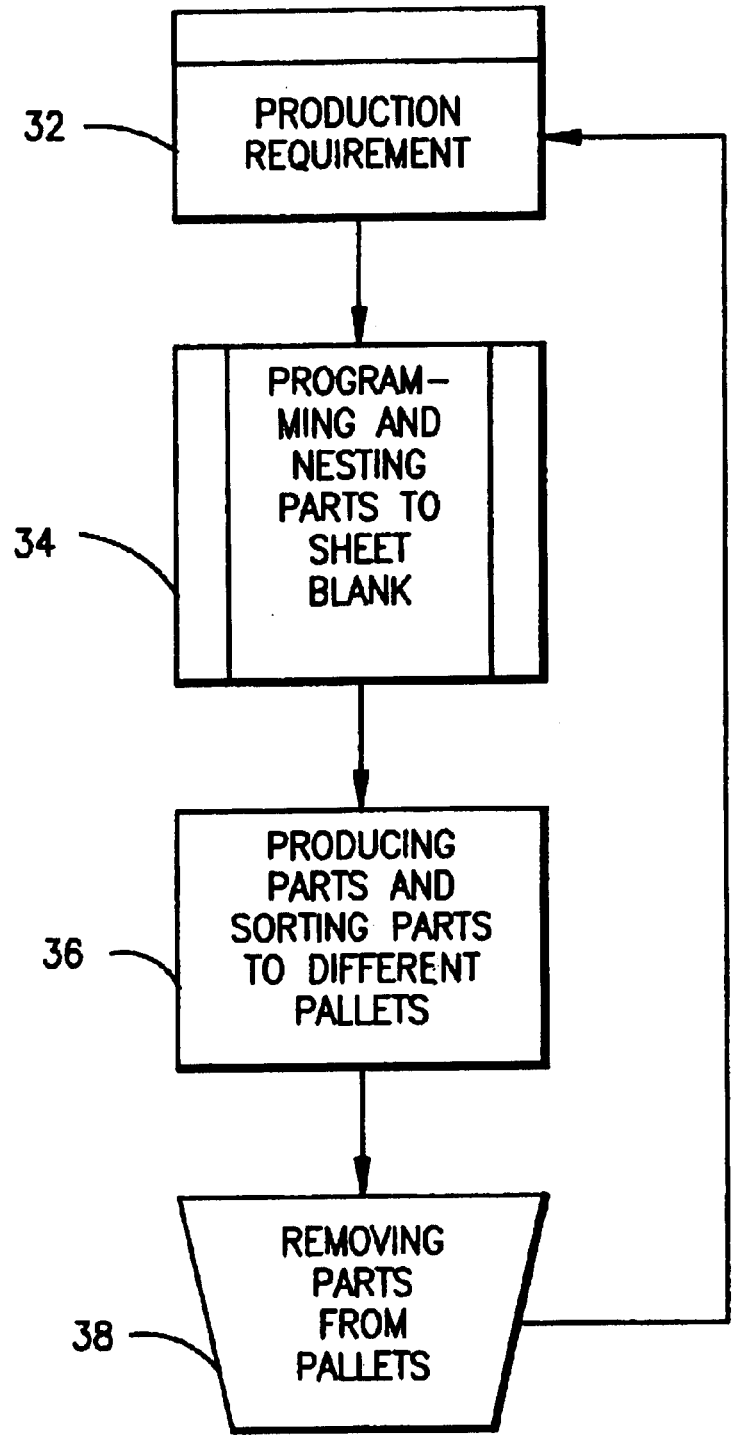
FIG. 2 is a flow chart giving a generalized overall view of the operation of the instant invention system.

FIG. 2 provides a general description of the operation of the flexible manufacturing system of FIG. 1. To begin, production requirements are input to the controller by way of keyboards, tapes, an input panel attached to the controller, or other conventional input means per step 32. Such production requirements include, among other parameters, the number of pieces to be cut from a worksheet, the thickness of the worksheet, the sizes and/or dimensions of the respective pieces to be cut, how many sheet blanks are to be processed, the respective sizes of the sheet blanks to be used, the types of materials to be used, the types of tools to be used, and the type of processing to be performed by the different tools, etc. These production requirements are used for programming and nesting parts to the sheet blanks per step 34.

More particularly with respect to step 34, nest programs, i.e., program routines, for performing work on worksheets are formulated, written and input in this step. The respective summaries of three different nest programs are shown in FIGS. 4, 6 and 8. In essence, what a nest program does is to guide the system in its fabrication of the different worksheets during the production run, i.e. the different operations that take place during the running of the program routine. Since ordinarily a number of nest programs are performed for each production run, different types of operations would occur at different times of the production run. The thus produced parts are sorted to different unloading receivers such as pallets in step 36. Thereafter, the finished parts are removed from the pallets per step 38.

For demonstration purposes, an exemplar batch processing summary is provided in FIG. 3. As shown, there are three nest programs (001, 002 and 003) to be executed during the production run. These program routines are designated by the line entitled "DNC Number in the Batch". As designated by the line entitled "Blank Sheet Size", for nest program 1, each worksheet is arbitrarily chosen to have a dimension of 96×48 inches. For nest program 2, the size of worksheets to be worked on is arbitrarily chosen to be 120×60 inches; while the size of worksheets to be operated on by nest program 3 is arbitrarily chosen to be 96×48 inches. It should however be appreciated that the size of a worksheet is not important for the operation of the nest programs.

For the exemplar nest programs shown in the line entitled "Blank Sheets to Process", one worksheet is to be operated on by each of those nest programs. As formulated, program 1 utilizes 91 percent of its worksheet whereas programs 2 and 3 each utilize 90 percent of their respective worksheets, per line entitled "Material Usage". Further with respect to the portion designated 40, seven different parts, or finished pieces, are to be produced from the three different nest programs during the exemplar production run. For instance, during the operation of nest program 1, 8 part 3 pieces, 3 part 5 and 15 part 6 pieces are produced. For nest program 2, in the meantime, 10 part 3 pieces, 9 part 4 pieces and 4 part 5 pieces are produced. Finally, in nest program 3, 7 part 1 pieces, 5 part 2 pieces, 2 part 3 pieces, 10 part 4 pieces, 13 part 5 pieces, 5 part 6 pieces and 1 part 7 piece are produced.

To provide further detailed description of the individual nest programs, refer to program 1 as illustrated in FIG. 4. Under the heading "COMPONENT(S):" the respective dimensions of part 3, part 5 and part 6 are shown. Specifically, part 3 pieces are shown to have a size of 44×11 inches; part 5 pieces 15×3.875 inches and part 6 pieces 3×3 inches. Under the heading "RUN TIME ESTIMATION-OPTIMIZED", the number of "Single Hits" to be effected by the chosen tool is to be 827. There is to be no nibbling since the "Nibble Hits" is zero. The total distance to be traveled by the to be worked on sheet blank is 1688.7993 inches. To perform nest program 1, the total number of "Tool Changes" is 5 while the "Total Time" in which the sheet will be operated on is 6 minutes and 31 seconds. The types of tool to be used are listed in the section entitled "TOOL ASSIGNMENT LIST".

With reference to FIG. 5, the layout over a representative worksheet to be worked on is shown. There the worksheet is designated 42, which is to be held by three clamps 44. The pieces to be worked on and cut from worksheet 42 can be seen to comprise 8 pieces of part 3, 3 pieces of part 5 and 15 pieces of part 6. Thus, a total of 26 pieces are to be cut from worksheet 42. Each of the to be cut pieces in turn is to be worked on by the different tools, as noted in FIG. 4, before the respective finished pieces are cut from the sheet blank. Prior to the instant invention, the way in which the different pieces are laid out, for example as shown in FIG. 5, would be sorted and unloaded the same way onto a pallet. However, as was mentioned previously, given that a number of nest programs are performed during a given production or batch run, conflicts in regard to the respective sorting addresses to which the cut pieces are to be moved oftentimes arise. When there is a conflict, the system would shut down or cease further operation until an operator/programmer can sort out or prioritized the different cut pieces for the different sorting addresses. Such conflict will be apparent in view of nest programs 2 and 3, to be discussed with reference to FIGS. 6 to 9 below.

As shown in FIG. 6, nest program 2 is defined to perform certain operations for fabricating from a sheet blank 3 types of cut pieces, namely part 3, part 4 and part 5. The total number of pieces to be cut from the sheet blank is 23, with 10 pieces of part 3, 9 pieces of part 4 and 5 pieces of part 5. The layout for cutting the pieces from a worksheet 46 is shown in FIG. 7. It should be noted that worksheet 42 of FIG. 5 has an arbitrary dimension of 96×48 inches whereas sheet 46 of FIG. 7 has an arbitrary dimension of 120×60 inches. Thus, 10 pieces of part 3 can be cut from the more spacious worksheet 42, as compared to only 8 pieces of the same part 3 being able to be cut from the nest program of FIG. 4.

Continuing with the last of the nest programs for the exemplar production run, it can be seen from FIG. 8 that the worksheet, designated 48 in FIG. 9, to be used for this nest program has a dimension of 96×48 inches. From worksheet 48, 43 separate pieces are to be cut. These separate pieces are specified under the heading "COMPONENT(S):" and are as follows: 2 pieces of part 3, 10 pieces of part 4, 13 pieces of part 5, 7 pieces of part 1, 5 pieces of part 2, 1 piece of part 7 and 5 pieces of part 6. The respective layouts of these pieces are shown in FIG. 9. Note the minimization of scraps for worksheet 48 as the different pieces are laid out. For example, 4 of the part 2 pieces are clustered in one section of worksheet 48 while the remaining part 2 piece is by itself.

From the layouts of FIGS. 5, 7 and 9, it can be seen that not only does each of the nest programs cut finished pieces from sheet blanks that may be of different dimensions, the respective layouts of the different parts to be cut from each sheet blank are different, i.e. the same piece cut from each sheet blank may be cut from a different location depending on the operations of the particular nest program. Witness the different numbers and locations of part 3 pieces to be cut from the different layouts of FIGS. 5, 7 and 9.

The fact that the same pieces may be cut from different locations of different sheet blanks would not pose any problems if the cut pieces from each sheet blank were to be placed the same way on separate receiving pallets, storage bins or cassettes. However, this entails an inefficient operation in which an unacceptable large number of receiver devices have to be put into operation. This is unrealistic since only a given number of pallets or storage bins, not to mention cassettes, may be effectively put into use at any one time.

The present invention solves this problem by assigning respective specific sorting addresses for to be cut pieces of different dimensions irrespective of whichever nest program, and whatever type of sheet blank, the pieces are to be cut from. To achieve this end, prior to the production run, the available area onto which finished pieces are to be placed is sub-divided into zones or locations each designated with a particular sorting address. In particular, prior to a production run, the relevant data from each of the nest programs that are to be operated on during the production run are collected and analyzed by the system processor. The relevant data may include for example the sizes and dimensions of all of the pieces to be cut from the different worksheet from each of the nest programs. The cut parts that are to have the same dimension, irrespective of whichever nest programs and/or worksheets they are to be produced from, are assigned the same sorting address so as to be unloaded onto the same location of an unloading area. Taking into consideration the thickness of the different cut pieces, more than one sorting address may be assigned to cut pieces having the same dimension. This being necessitated by the fact that cut pieces may be stacked only to a predetermined height. In other words, once a stack of cut pieces of a given dimension has reached a predetermined height, cut pieces of the same dimension are necessarily routed to a second sorting address at the same unloading area, or another unloading area, i.e. another pallet, storage bin or cassette. This use of alternate sorting addresses for the same dimensioned cut pieces can continue ad infinitum, as long as there are available space in the unloading area, or if there are additional unloading areas. Such is the "denester" approach of the instant invention.

For the present invention, during the production run, new nest programs may be added. As each of the new nest programs is added, its relevant data are extracted and analyzed, so as to be compared with the previously extracted and analyzed data of the nest programs input prior to the production run. Cut pieces of a dimension that had previously been assigned a sorting address at an unloading area are of course also routed to that area. Each of the cut pieces that has a new dimension is assigned a new sorting address, which may designate an unused space in the unloading area that is in operation, or a new unloading area. How different unloading areas may be utilized will be discussed further below.

Insofar as the instant invention system utilizes a number of different sorting and unloading systems, different setups of sorting addresses are used for each of the mechanisms. For example, return to FIG. 1. There, it can be seen that there are a conveyor sorting mechanism 20, a sorting unit 18 and a stacking/unloading system 22.

To enhance the understanding of how the different pieces are to be moved to different sorting addresses of stacking/unloading system 22 so that pieces of different dimensions may be placed onto the available storage area of the system, such as that on cassette 28, a more detailed description of the operation of the present invention unloading/stacking system is given hereinbelow with reference to FIGS. 10A and 10B.

Figure 10B:
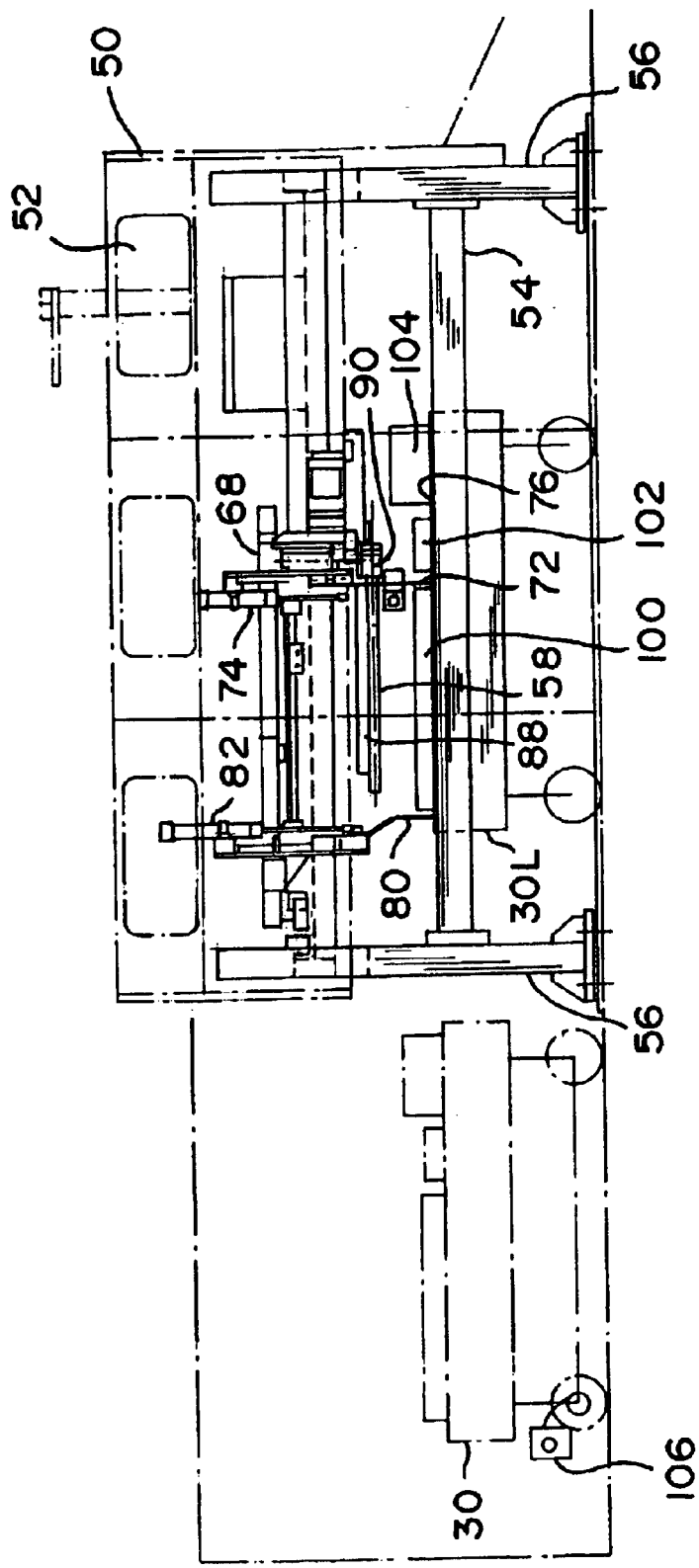
FIG. 10B is a side view of the FIG. 10A stacker sorting mechanism.

As shown in the plan view of FIG. 10A and the cross sectional view of FIG. 10B, the stacker mechanism of the instant invention system is enclosed in a housing 50 to enhance safety. To allow easy viewing from outside of housing 50, a number of windows 52 are provided. The stacker mechanism is mounted on cross frames 54 supported by four columns 56. A plurality of retractable rollers 58 provide the base for the stacker mechanism onto which finished pieces are conveyed and moved. For the sake of clarity, only a limited number of rollers 58 are shown in FIG. 10A, albeit it should be noted that each of the lines 60, in actuality, represents one of the rollers. Thus, given the plan view of FIG. 10A, a cut piece 62 is provided to the stacker mechanism (possibly via conveyor system 20 of FIG. 1) as indicated per directional arrow 64.

Overhangingly mounted to the frame of the stacker mechanism is a stationary beam 66 perpendicularly on which a number of cross beams 68 are mounted. As shown, mounted to beam 66 are a number of guides 70 each comprising a number of extending fingers 72 each interspersed between two adjacent rollers 58. Guides 70 each are movable and are driven vertically by a motive means such as for example a hydraulic cylinder 74. In the up position, fingers 72 are positioned away from plane of 76 of FIG. 10B, which represents the surface of a storage area, for example that of the cassette 30 shown at its loading position 30L. When down, the tips of fingers 72 form a partition on the surface of the storage area, as shown in FIG. 10B.

Movably mounted across cross beam 68 is a support beam 76 onto which a number of guides 78, movable vertically, are mounted. Similar to guides 70, guides 78 each have attached thereto a plurality of extending fingers 80 bent as shown in FIG. 10B. Similar to fingers 72, fingers 80 may be moved vertically by means of driving mechanisms such as hydraulic cylinders 82 shown in FIGS. 10A and 10B. Beam 78 is movable along the Y direction, and is driven by a servomotor 84 and its corresponding ball bearing 86. Thus, as beam 76 is moved along the Y axis, fingers 82 likewise are moved along the same axis. It should be noted that fingers 82, like fingers 72, are mounted to be interspersed between adjacent rollers 58 when they are in the down position to form a boundary on surface 76 of the storage area.

For the embodiment stacker mechanism shown in FIGS. 10A and 10B, pivotally mounted to each of cross beams 68 is a stop 88 which can be pivoted to the down position, shown in FIG. 10B, for stopping the movement of a cut piece conveyed along rollers 58. When pivoted to its up position (not shown), a cut piece can slide thereunder as it is conveyed by rollers 58. For the embodiment shown in FIG. 10A, there are four stops 88a, 88b, 88c and 88d for separating the stacker mechanism into four areas, or cells, each being roughly divided by a pair of stoppers 88 and cross beams 68. It should be appreciated that more (or less) than four stops may be utilized so that the stacker mechanism may be subdivided into a greater (or smaller) number of areas.

Although not shown clearly, each of rollers 58 (60) is driven, for example by motor 90 shown in FIG. 10B. Each successive adjacent pair of rollers 58 are bounded by a belt or chain so that as motor 90 rotates, each of the rollers would likewise rotate. The rotation of rollers 58 enhances the conveyance of a cut piece thereon along direction 64. As mentioned before, rollers 58 are retractable. This retractability is effected, for two adjacent cells of rollers, by an air cylinder 92 mounted on a pair of support beams 94. Provided at each end of air cylinder 92 is a shock absorber 96 to dampen and smooth the movement along the Y direction of a support 98 to which the rollers are rotatably mounted.

Inasmuch as the rollers of selected cells may be retracted, a cut piece which is at rest on those rollers (being kept in place by the appropriate stopper 88), may be dropped from the plane where the conveying rollers are onto a particular location on surface 76 of the storage area. To elaborate, suppose a cut piece 62 has been conveyed along direction 64 onto the rollers of the stacker mechanism. Further suppose that stoppers 88a, 88b and 88c have been pivoted to the up position. Given that, cut piece 62 would be conveyed to the cell defined by stopper 88d. And when air cylinder 92b is operated to retract the rollers 58, cut piece 62 is dropped onto an area below the cell defined by stopper 88d.

For the instant invention, each of those cells shown in FIG. 10A is given a sorting address. For example, cell 88d may be given a sorting address 1, 88c a sorting address 2, 88b a sorting address 3, and 88a a sorting address 4. Of course, if there are more (or less) than four stops, there would correspondingly be more (or less) than four cells. Instead of separate stoppers, one single movable stopper that can vary the size of the cells along the X direction may also be used.

Alternatively, the sorting addresses may be assigned to the different locations on the surface area of the storage device onto where the cut pieces are to be deposited. For example, instead of cell 88d being assigned a sorting address, it is the location of the storage area of the cassette (or pallet placed thereon) where the cut pieces from cell 88d are to be deposited that is assigned sorting address 1. Likewise, the location onto where cut pieces from cell 88c are to be deposited is designated sorting address 2; that from cell 88b sorting address 3; and that from cell 88a sorting address 4.

A sensor is provided in front of each of the stoppers 88. This sensor, in the form of a movable plate, is used to detect the oncoming of a cut piece to the particular stopper. The sensor, not shown, provides a signal to the controller to begin the retraction of rollers 58, as it encounters the cut piece. By receiving a lead signal before the cut piece hits and is stopped by the appropriate stopper 88, the system is able to begin the retraction of the appropriate set of rollers for more efficient operation. In other words, once the cut piece is detected by the sensor, a signal is sent to the controller to begin retraction of the rollers. Thus, by the time the cut piece is stopped by the stopper from further movement (i.e. lined up correctly), the rollers are retracted so that the cut piece is vertically placed or deposited onto the appropriate location of the storage area, thereby saving production time.

As discussed above, insofar as beam 76 is movable along the Y direction, the left extension fingers 80 and the right extension fingers 72 together can define a plurality of zones for each of the cells along the Y axis. The dimension to be assigned to each of those zones is dependent on the respective sizes of the cut pieces to be conveyed thereto. For example, as shown in FIG. 10B, a stack of cut pieces, designated 100, is shown to be confined by fingers 80 and fingers 72. Simply put, each cut piece of stack 100 has been conveyed to the same cell (or sorting address) and deposited onto the same location (or sorting address) of the cassette. The bent portion of each finger 80 provides a degree of freedom for the being deposited cut piece to settle into the defined location of the storage area. As should easily be recognized, the location of the area defined by stack 100 is different from the area defined by stack 102, whose cut pieces have a smaller dimension, and also from the area defined by stack 104, whose cut pieces have a dimension intermediate of those of the cut pieces of stacks 100 and 102.

To optimally utilize the storage area, as for example the surface of cassette 30 shown in FIGS. 10A and 10B, the cassette is movable along the Y axis, driven for example by a motor 106. Thus, depending on the size of the cut sheet to be deposited onto the storage area, and further depending on the predefined sorting address to which the cut piece is to be moved, cassette 30 is moved along the Y axis, as the cut piece is being moved along the X axis to its predetermined cell at the stacker mechanism, so that a given location of the storage area is positioned below the appropriate rollers such that, upon retraction of the rollers, the particular cut piece is deposited onto the given location. Cut pieces having the same dimension are directed to the same cell on the stacker mechanism and the same location of the cassette is moved below the appropriate rollers. Accordingly, a stack of cut pieces having the same dimension is formed as more and more of the same dimensioned cut pieces are deposited onto the same location of the storage area.

The operation of the stacker mechanism and the movement of the cassette are controlled by controller 14. Instead of being deposited directly onto the surface of the cassette, a number of pallets, for example those designated 28 in FIG. 1, may be placed on top of the cassette to provide easier removal of the finished pieces from the cassette. Thus, as most clearly shown in FIG. 10B, the cassette is movable to its unloading position, represented by an outline of the cassette in dotted format, and the loading position, designated by 30L.

Although one cassette is shown in FIGS. 1 and 10 for the sake of clarity, in practice, a number of cassettes, each positionable under the stacker mechanism, may be used. By systematically positioning different cassettes, and in particular respective specific locations of each of the cassettes, below the appropriate cell of the stacker mechanism, the system ensures the smooth operation of the production run. To elaborate, suppose the unloading area of a first cassette has been optimally divided into seven sub-areas for receiving cut pieces having seven predefined dimensions. Now assume that one of the nest programs requires the fabrication of cut pieces having yet a different dimension. Given the fact that the unloading area of the first cassette has already been divided into sub-areas none of which is meant to accept the new dimensioned cut pieces, the system would then allocate a new sorting address at a given location of a second cassette. Thus, when the time comes during the production run that cut pieces of the new dimension are to be conveyed to the stacker mechanism, the first cassette (assuming that it has been positioned underneath the stacker mechanism all along) is automatically removed and replaced by the second cassette, with the appropriate location of the second cassette being placed under the appropriate cell of the stacker mechanism for receiving the new dimensioned cut pieces. The multiple number of cassettes may be sorted in an automatic storage system such as system 2 shown in FIG. 1.

Figure 11:
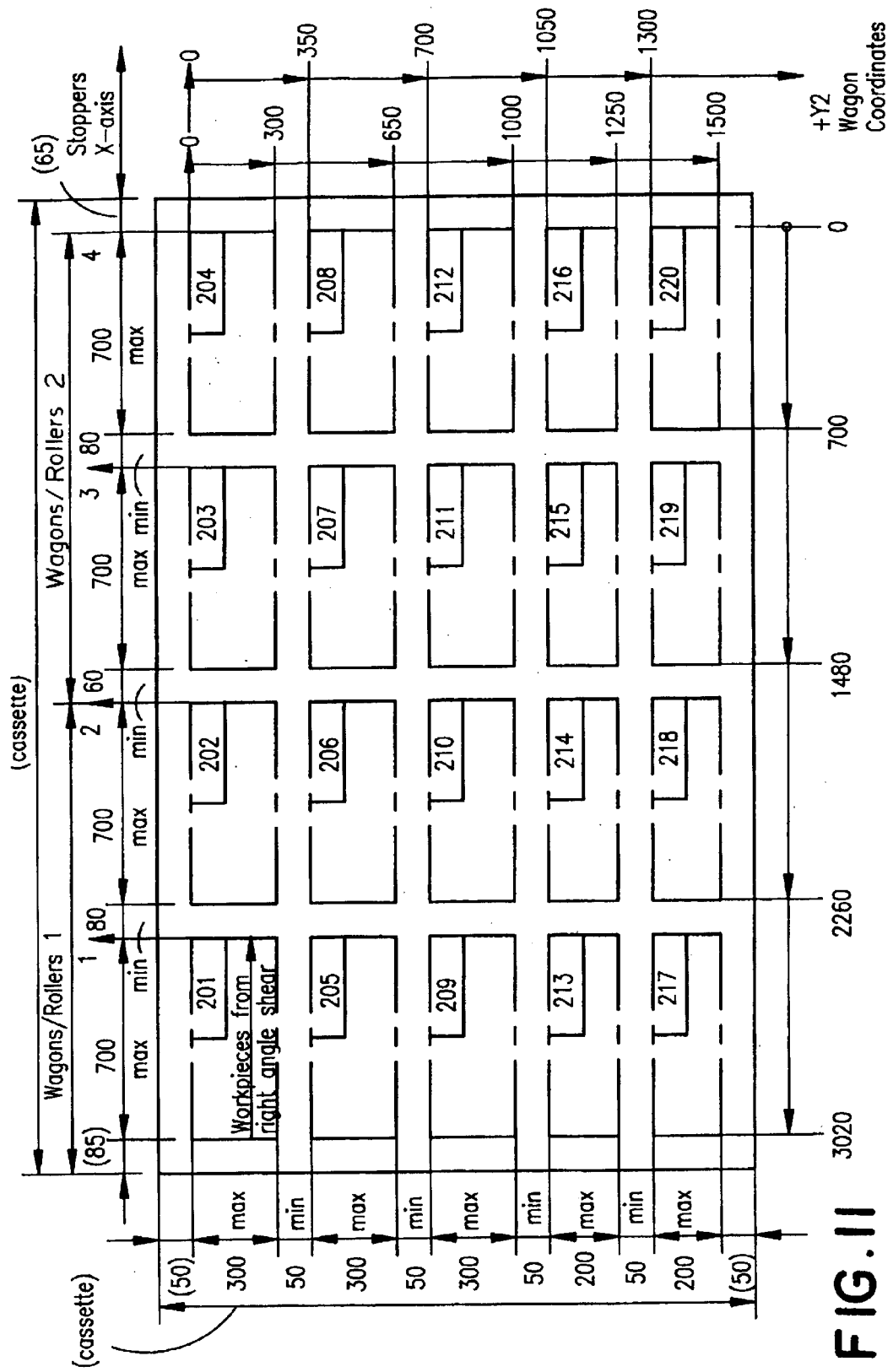
FIG. 11 is an illustration that shows the different sorting addresses of the available space of an unloading area to which finished pieces are to be moved.
Figure 12:
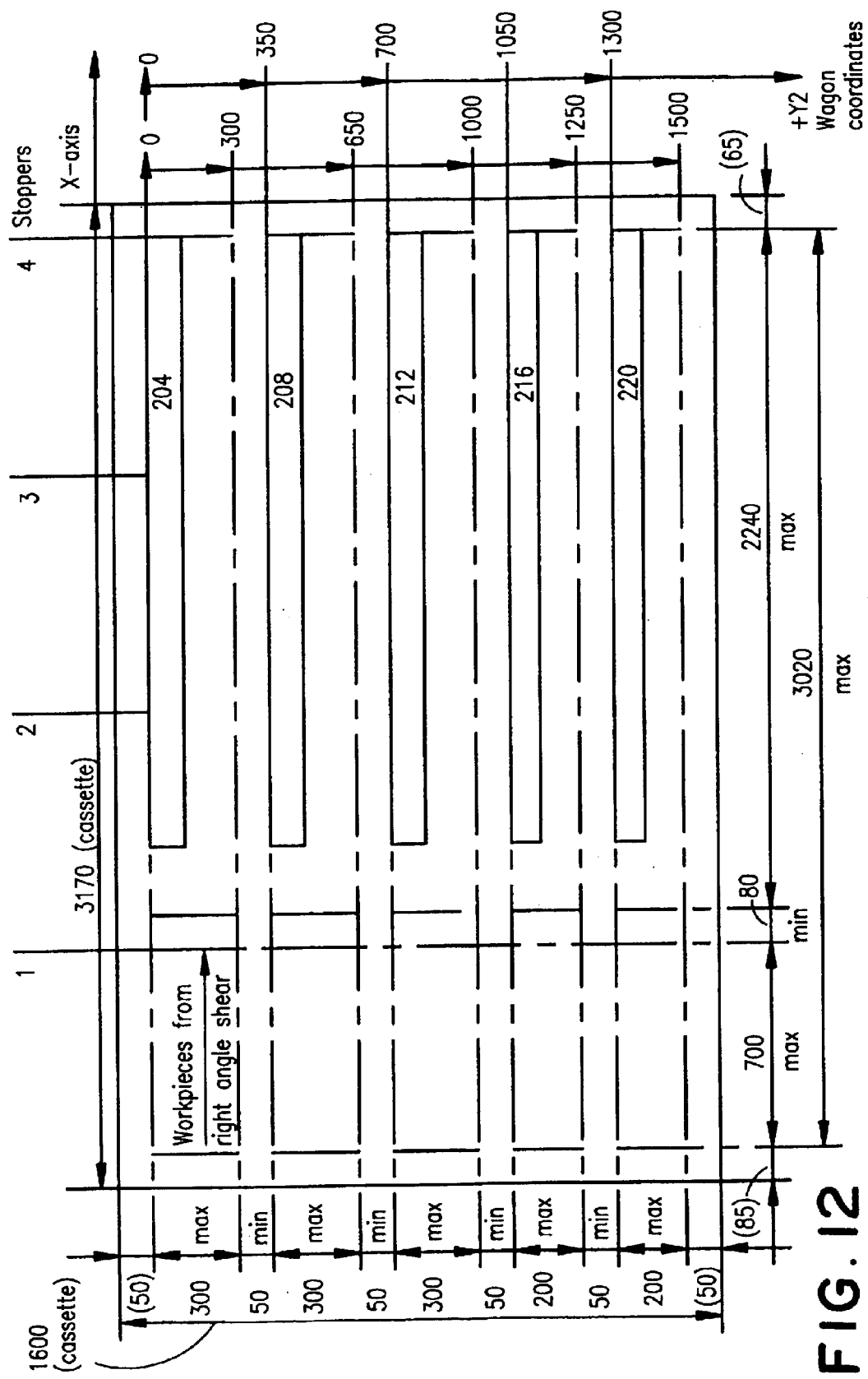
FIG. 12 is an illustration of another exemplar layout of the sorting addresses of the available space of an unloading area.
Figure 13A:
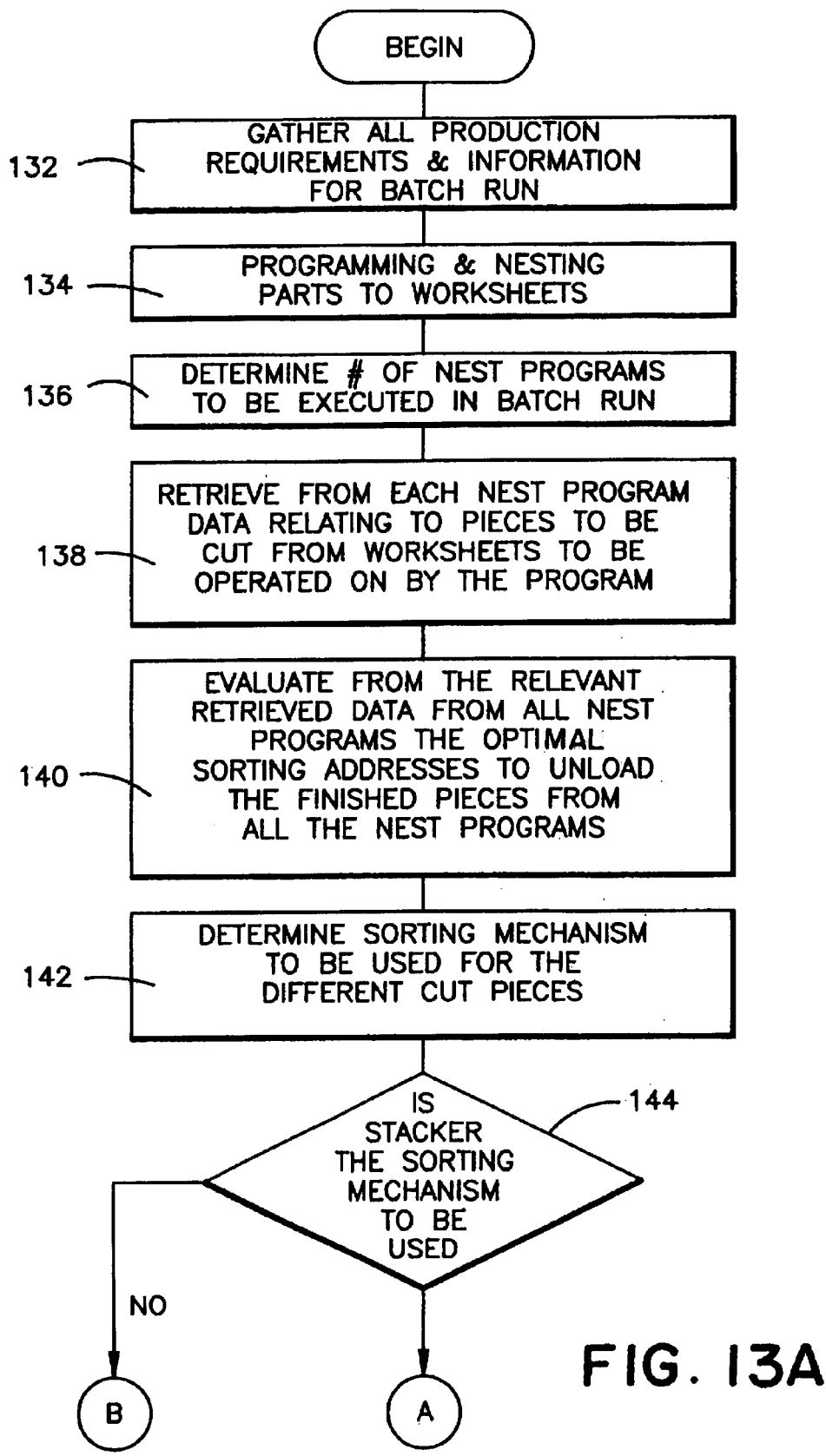
FIGS. 13A, 13B, 13C and 13D, is a flow chart illustrating the operation of the instant invention method.
Figure 13B:
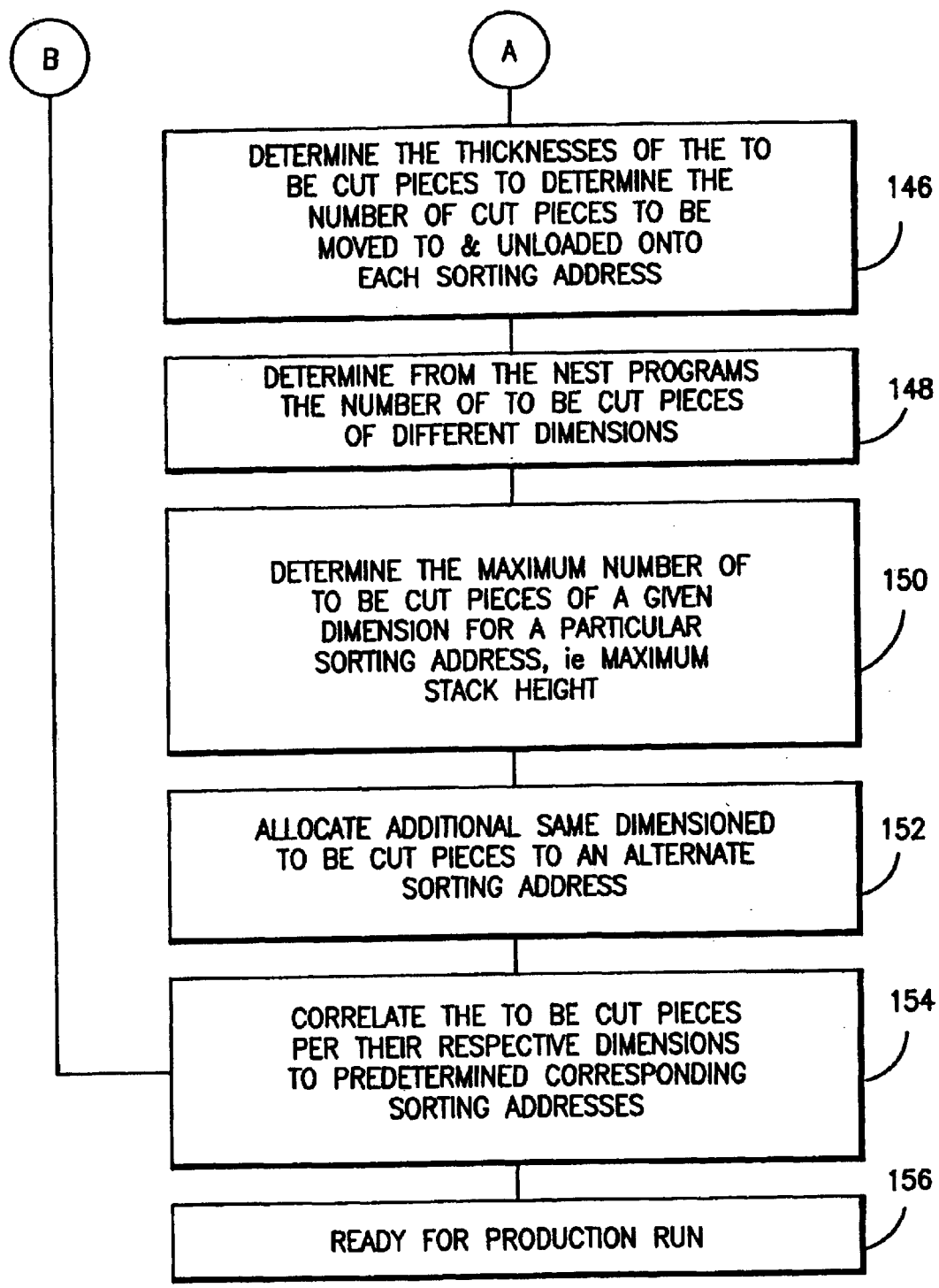
Figure 13C:
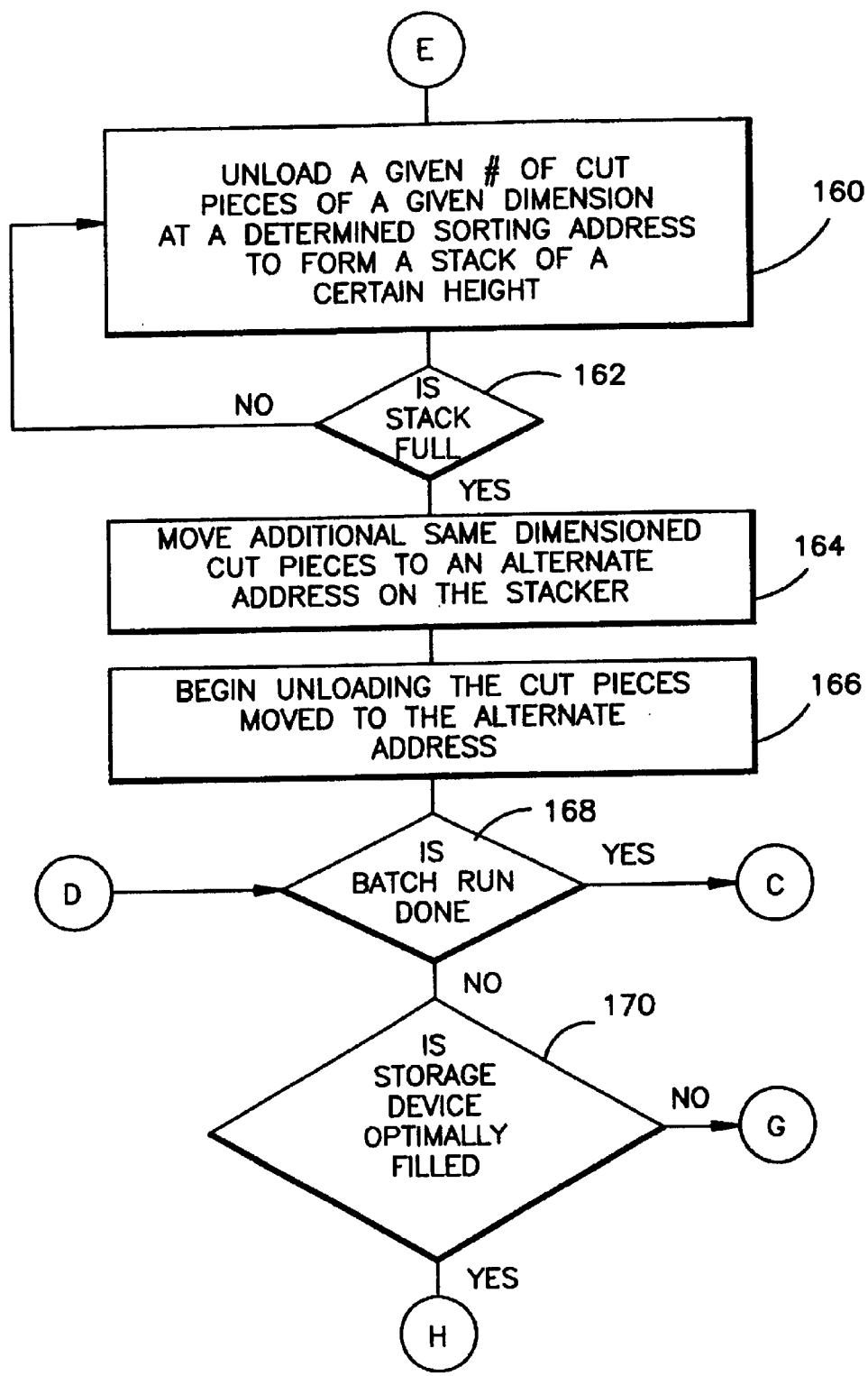
Figure 13D:
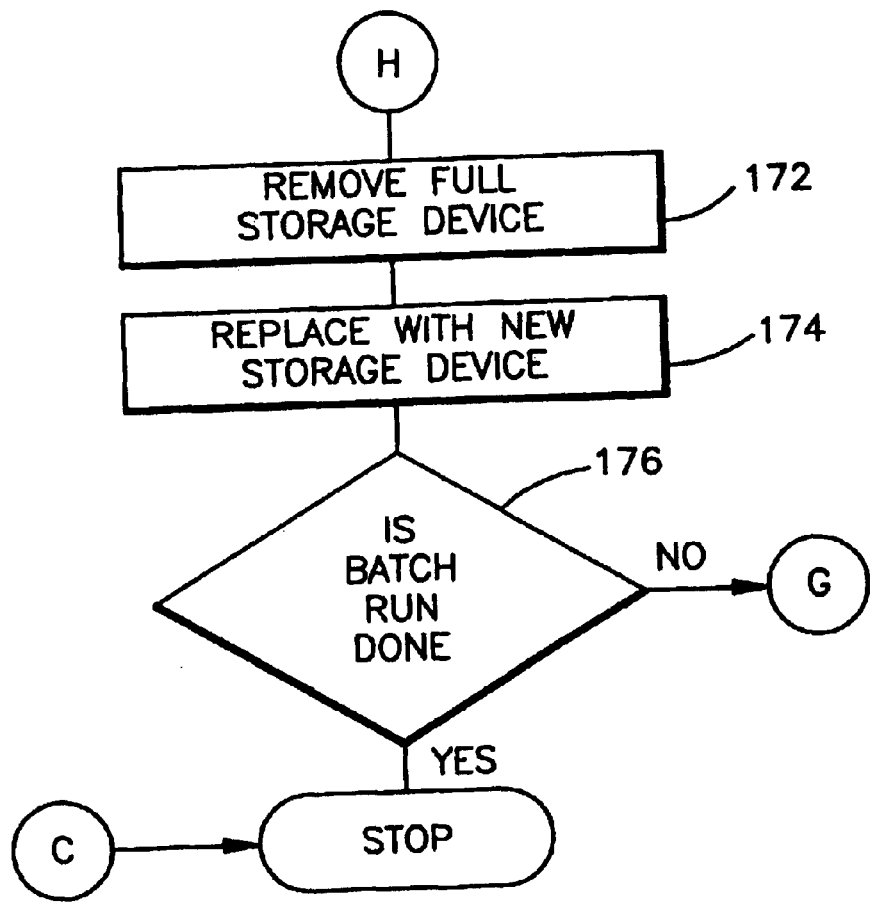

FIGS. 11 and 12 illustrate exemplar layouts of sorting addresses for the storage areas of a receiver means at the unloading portion of the present invention system. In particular, these layouts refer to the storage area of a cassette to be used to receive deposits of stacks of cut pieces from the stacker/unloading system 22. It should be appreciated that in place of a cassette, other types of receivers such as storage bins or pallets may be used. The storage area of each receiver is divided into a number of sections with different sorting addresses. It should further be appreciated that each storage bin receiver can be assigned only one sorting address insofar as the way in which cut pieces are deposited into a storage bin is quite different from the way in which cut pieces are deposited on a cassette. This is due to the fact that most likely storage bins are placed underneath unloading systems such as the conveyor system 20 or the sorting unit 18 shown in FIG. 1. Note that a number of storage bins 26 are placed underneath a corresponding number of conveyor sections each of which has an end that is pivotable upwards. Note also that one of the conveyor sections has been raised.

Thus, the cut pieces which are put onto conveyor system 20 would be conveyed by the conveyor section to the left of the upraised conveyor section so that they would shoot into the storage bin positioned under the upraised conveyor section which has been specifically referenced as 26. Cut pieces of different dimensions are of course conveyed by different conveyor sections to different storage bins, by raising the appropriate conveyor section.

Focus on FIG. 11. There, it can be seen that the storage area of the particular cassette has a length of 3,020 inches along the X axis and 1,500 inches along the Y axis. For the exemplar embodiment shown in FIG. 11, the area is divided into 20 different zones, or locations, each designated with a particular sorting address. Given that the stacker mechanism shown in FIG. 10A is illustrated as being divided into 4 different cells, the storage area of the cassette likewise is divided into four sections along the X axis. Thus, sorting addresses 204, 208, 212, 216 and 220 correspond to the cell defined by stopper 88*d;* 203, 207, 211, 215 and 219 defined by the cell of stopper 88C; addresses 202, 206, 210, 214 and 218 by the cell of stopper 88*b;* and addresses 201, 205, 209, 213 and 217 by the cell of stopper 88*a*. In order to position the respective sorting addresses to be below the appropriate cell, the cassette is movable along the Y axis so that, for example, each of addresses 204, 208, 212, 216 and 220 may be placed below cell 88*d*. Finished pieces conveyed to cell 88*d* can therefore be deposited onto the appropriate sorting address location.

As should further be appreciated, albeit the storage area has been defined by 20 sorting addresses, a different number of sorting addresses and therefore areas for storing the finished pieces may also be effected. This is necessary insofar as pieces of different dimensions may be cut and conveyed to the stacker mechanism. For example, with reference to FIGS. 5, 7 and 9, it should be appreciated that pieces such as part 3 presumably require a space larger than that defined by even the biggest of the sorting addresses. In other words, for part 3 pieces, a combination of sorting addresses of FIG. 12 such as 212, 211, 215 and 216 is required. The four spaces defined by those addresses are accordingly redefined as a single area to which a single sorting address such as 212 is designated. See for example FIG. 12 in which the storage area has been redefined into only 5 sorting addresses of 204, 208, 212, 216, 220. For the FIG. 12 layout, it should be appreciated that those defined sorting addresses each now cover 3 of the cells (88*d*, 88*c* and 88*b*) of the stacker mechanism. For both layouts of FIGS. 11 and 12, it should also be appreciated that the area along the Y axis defined by each of the sorting addresses is configured by the movement of extension fingers 78 relative to the extension fingers 72.

The present invention system takes all of the nest programs, and more specifically the parameters of the to be cut pieces of the different programs, into consideration before the production run and assigns sorting addresses for the different locations of the storage area(s). Thus, once production run begins, as the pieces are cut and conveyed to the appropriate sorting mechanism to be unloaded, each of those pieces will be conveyed to the appropriate cell of the sorter mechanism (for example the stacker mechanism) and unloaded onto the appropriate location designated by the corresponding sorting address on the storage surface of the receiver means, be it pallets, cassettes, storage bins, etc. Furthermore, the respective sizes of the different locations designated by the different sorting addresses are predetermined so that cut pieces of the same dimension are always deposited onto the appropriate location. Accordingly, no conflict exists as the production run proceeds, as each of the cut pieces, irrespective of whichever nest program orders it to be cut and worksheet from which it has been cut, would end up being deposited onto the appropriate location of the predetermined receiver means.

As stated before, the sorting mechanism of conveyor system 20 shown in FIG. 1 comprises a multiple number of tiltable conveyor sections. For the present invention system, each of the storage bins positioned under a conveyor section is assigned a sorting address.

In addition to the sorting/unloading systems shown in FIG. 1, other sorting/unloading systems may also be used. One such system that comes to mind is a robot arm mechanism which is described in co-pending application Ser. No. 717,897, now U.S. Pat. No. 5,317,516 the disclosure of which is incorporated herein by reference. In brief, such robot system operates similarly to the stacking/unloading system 22. In essence, each of the finished pieces is picked-up by the robot arm and unloaded onto a given storage area in accordance with the particular sorting address of the storage area designated for that type of cut pieces.

The operation of the present invention system denester program is discussed herein with reference to the flow chart of FIG. 13. To begin, all production requirements and information for the production run are gathered per step 132. The production requirements may refer to the type of tools to be used, how many tools are to be used, the type of hits, the time the production is to run, etc. A lot of these production requirements are listed in the nest program summaries noted on FIGS. 4, 6 and 8.

Having gathered the production requirements and the data relating to the production run, nest programs are provided to the controller per step 134. The operations of the different nest programs have been discussed, supra, with reference to FIGS. 4, 6 and 8. Moreover, the sequence of operations of the different nest programs are decided and the summary for performing the nest programs is given with respect to the instant exemplar embodiment in FIG. 3. Thereafter, the number of nest programs to be executed in the production run is determined in step 136. For the instant exemplar embodiment, as discussed previously, there are 3 nest programs to be executed.

In step 138, data or parameters relating to the to be cut pieces for each of the nest programs are retrieved. Some of these data include the sizes or dimensions of the pieces to be cut, the respective thicknesses of the worksheets from which the pieces are to be cut and the number of pieces to be cut. Next, from the retrieved relevant data of all of the nest programs, the optimal sorting addresses on the receiver area (or the stacker mechanism) onto which the finished pieces are to be placed from all of the nest programs are evaluated in step 140. The purpose of this step, in brief, is to "denest" all of the relevant data for each of the nest programs and re-organize that data into a single file or program routine for which all of the pieces to be cut from the different nest programs are to be allocated to their respective corresponding sorting addresses.

By performing this step prior to the production run, any conflict that may arise from pieces cut from different nest programs that otherwise would have "hung-up" the system are eliminated, as the different sorting addresses are allocated to cut pieces of different dimensions. Thus, instead of allocating, for example, sorting address 204 (FIG. 11) to part 1 (per layout of FIG. 9) or part 4, (per layout of FIG. 7), or even part 6 (per layout of FIG. 5), with the complete evaluation of the different cut pieces from the different programs, sorting address 204 may now be allocated instead to, for instance, part 3 pieces. It is moreover during this step 140 that the optimal utilization of space for the storage area is to be determined so that only a minimal amount of unused space, if any, remains on the storage area of the receiver means.

In step 142, the type of sorting/unloading mechanism to be used for the different pieces to be cut during the production run is determined. For example, it may be decided that part 4 and part 6 pieces are to be directed to corresponding sorting addresses of conveyor system 20 while the remaining pieces are to be conveyed to stacker/unloading system 22. For the parts to be diverted to conveyor system 20, each of those parts is assigned a sorting address corresponding to one of the tiltable sections, so that those parts will be deposited into the appropriate storage bins 26.

A decision is made on whether the cut pieces are to be directed to the stacker/unloading system 22 in step 144. If it is, then further evaluation is taken with respect to the thicknesses of the worksheets from which the finished pieces are to be cut, per step 146. The reason for this determination is to ascertain the height of each of the stacks of pieces to be deposited onto the cassette 28 (or pallet) positioned below the stacker mechanism. To elaborate, suppose the worksheets from which pieces are to be cut each have a thickness of $\frac{1}{32}$ inch. Further suppose that for safety reasons, a height of 36 inches separates the bottom of the stacker mechanism from the surface of the storage area of the cassette. Naturally, the number of sheets that may be placed on a given location would be at most 1152 (32×36). Anything over that would either be hazardous or would cause some problem. Thus, by taking into consideration the thickness of the cut pieces, the processor is able to determine the maximum number of pieces that may safely be provided onto a given location with a particular sorting address. Given those facts, a decision can be made to move any cut pieces having the same dimension beyond a given number of pieces (1152 pieces for the instant example) to an alternate location via a second sorting address, to be discussed later.

The pieces to be cut are sorted in accordance to their respective dimensions per step 148. The system then correlates the thus dimensioned to be cut pieces with previously evaluated corresponding sorting addresses at the particular sorting mechanism at step 152. Thus, the system determines how many cut pieces of a given dimension are to be moved to a corresponding predetermined sorting address to form a stack of cut pieces of a certain height. (To achieve this during the production run, in the case of a stacker mechanism, as was discussed previously with reference to FIGS. 10A and 10B, the respective cut pieces are moved individually to the different cells of the stacker mechanism. At the same time, the cassette 28 is moved along the Y direction so as to position the appropriate area thereof underneath the corresponding cell, so that the appropriate sorting address, with reference to the cassette, is positioned below the appropriate rollers of the given cell. Once the approach of the cut piece is sensed, the appropriate set of rollers begin to be retracted so that once the cut piece makes contact with the stopper and is held thereby, the rollers are fully retracted to deposit the cut piece onto the predetermined sorting address location to begin a new stack or to add to the stack of cut pieces of that given dimension already on the cassette.)

In the meantime, a determination is made on the maximum number of cut pieces for a particular sorting address per step 150. If it is determined that greater than the maximum number of cut pieces of the same dimension are to be fabricated from the different nest programs during the production run, pieces of the same dimension which exceed the maximum number are programmed to be routed to an alternate sorting address on the storage area of the receiver means per step 152. The location for the alternate address naturally is determined to have sufficient area for receiving cut pieces of the same given dimension. It should be appreciated that since the "denesting" of the nest programs, there is a ready knowledge of the number of cut pieces of a given dimension to be produced during a production run so that the necessary number of alternate sorting addresses may be predefined.

Do note, however, that there is always the possibility that new nest programs may be added during the production run. In which case the relevant data relating to the cut pieces of the newly added nest programs are correlated with the previously "denested" data for evaluating the optimal sorting addresses for which the cut pieces from the new nest programs are to be routed. This ordinarily is of no problem insofar as different cut pieces with different dimensions most likely had been determined from the nest programs input to the system prior to the production run. Thus, the same dimensioned cut pieces from the nest programs can be assigned to the same sorting address, as the production run proceeds, so long as there remains available space at the predetermined location of the unloader. In other words, so long as the stack of cut pieces of a given dimension has not reached a predetermined height, cut pieces of the same dimension from the new nest programs can be routed by the system to the same sorting address. However, in the instance where the to be cut pieces from the new nest programs have a dimension that does not match any of the dimensions previously defined by the nest programs input prior to the production run, the system will create new sorting addresses for the newly dimensioned to be cut pieces. These new sorting addresses may be assigned to the same cassette that is in operation, provided that sufficient unused space is available on that cassette. If not, the system would allocate the new sorting addresses to a new cassette, or other storage devices, such that the sorting and unloading of the newly dimensioned to be cut pieces from the newly added nest programs are smoothly integrated into the same production run.

Inasmuch as the present invention is subject to many variations, modifications or changes in detail, it is intended that all matter throughout this specification and shown in the accompanying drawings be interpreted only as illustrative and not in a limiting sense. Accordingly, it is intended that the invention be limited only by the spirit and scope of the appended claims.

What is claimed is:

1. In a production process involving a plurality of nested programs, each of said nested programs cutting pieces from at least one particular worksheet having a given dimension, the layout of the pieces to be cut from said particular worksheet by said each nested program being different from the respective layouts of pieces to be cut from other particular worksheets by the other nested programs, a method of denesting said plurality of programs, comprising the steps of:

reviewing all of said plurality of nested programs;

retrieving data relating to each of the to be cut pieces from each of said nested programs;

evaluating each of the to be cut pieces to determine a sorting address for said each to be cut piece;

reorganizing the data relating to each of the to be cut pieces into a single file in accordance with the respective sorting addresses for the to be cut pieces.

2. In combination, a storage system for storing a plurality of worksheets of various dimensions;

at least one sheet fabrication system for cutting pieces from any one of said worksheets;

an unloading system for moving cut pieces away from said sheet fabrication machine onto an unloading area; and processor means for controlling the respective operations of the systems to run a production process involving a plurality of programs each to run independent of the others each of said programs controlling said sheet fabrication system to cut pieces from at least one particular worksheet having a given dimension, the layout of the pieces to be cut from said particular worksheet by said sheet fabrication system operating under said each program being different from the respective layouts of pieces from other particular worksheets to be cut by said sheet fabrication system operating under the other programs;

wherein preparation of said production process, said processor means further reviews all of said plurality of programs;

retrieves data relating to each of the to be cut pieces from each of said programs;

evaluates each of the to be cut pieces to determine a sorting address for said each to be cut piece;

reorganizes the data relating to each of the to be cut pieces into a single file in accordance with the respective sorting addresses for the to be cut pieces.

* * * * *